(12) United States Patent
Ahn et al.

(10) Patent No.: US 11,395,224 B2
(45) Date of Patent: Jul. 19, 2022

(54) METHOD OF OPERATING IN IDLE MODE AND APPARATUS USING SAME

(71) Applicant: LG Electronics Inc., Seoul (KR)

(72) Inventors: Joonkui Ahn, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 23 days.

(21) Appl. No.: 16/967,684

(22) PCT Filed: Feb. 11, 2019

(86) PCT No.: PCT/KR2019/001611
§ 371 (c)(1),
(2) Date: Aug. 5, 2020

(87) PCT Pub. No.: WO2019/156515
PCT Pub. Date: Aug. 15, 2019

(65) Prior Publication Data
US 2021/0037463 A1    Feb. 4, 2021

Related U.S. Application Data

(60) Provisional application No. 62/628,295, filed on Feb. 9, 2018.

(51) Int. Cl.
G08C 17/00 (2006.01)
H04W 52/02 (2009.01)
H04W 68/00 (2009.01)
H04W 72/04 (2009.01)

(52) U.S. Cl.
CPC ....... *H04W 52/0209* (2013.01); *H04W 68/00* (2013.01); *H04W 72/0406* (2013.01)

(58) Field of Classification Search
USPC .... 370/229, 230, 230.1, 235, 236, 252, 311, 370/328, 329, 330, 395.4
See application file for complete search history.

(56) References Cited

U.S. PATENT DOCUMENTS

2013/0301582 A1* 11/2013 Jiang ................... H04W 72/042
  370/329
2017/0105179 A1    4/2017 Kusashima et al.
2018/0027522 A1* 1/2018 Lee ................... H04W 72/0413
  370/336

(Continued)

FOREIGN PATENT DOCUMENTS

KR    20130062242    6/2013
KR    20150106921    9/2015

(Continued)

OTHER PUBLICATIONS

NTT DOCOMO, Inc., Views on SPS activation/deactivation mechanism, R1-1720782, 3GPP TSG RAN WG1 Meeting #91, Reno, USA, Nov. 27-Dec. 1, 2017, 3 pages.

(Continued)

*Primary Examiner* — Nguyen H Ngo
(74) *Attorney, Agent, or Firm* — Fish & Richardson P.C.

(57) ABSTRACT

A wireless device receives, in an idle mode and by using a paging message, a semi-persistent scheduling (SPS) command indicating activation of SPS transmission. The wireless device performs the SPS transmission in the idle mode according to the SPS command.

7 Claims, 7 Drawing Sheets

(56) References Cited

U.S. PATENT DOCUMENTS

| | | | | |
|---|---|---|---|---|
| 2019/0029006 A1* | 1/2019 | Wang | ................ | H04W 72/1289 |
| 2019/0182800 A1* | 6/2019 | Park | ..................... | H04W 80/02 |
| 2019/0364492 A1* | 11/2019 | Azizi | ................. | H04W 68/005 |
| 2020/0275409 A1* | 8/2020 | Gonzalez | ............ | H04W 56/001 |
| 2021/0185683 A1* | 6/2021 | Reial | .................. | H04W 72/042 |

FOREIGN PATENT DOCUMENTS

| | | |
|---|---|---|
| WO | WO2017171525 | 10/2017 |
| WO | WO2017191917 | 11/2017 |
| WO | WO2020032659 | 2/2020 |

OTHER PUBLICATIONS

Extended European Search Report in European Appln. No. 19750578.7, dated Oct. 22, 2021, 11 pages.

LG Electronics Inc., "Further consideration on SPS for NB-IoT," R2-1711572, 3GPP TSG-RAN WG2 Meeting #99-Bis, Prague, Czech Republic, dated Oct. 9-13, 2017, 4 pages.

Samsung, "Tradeoffs for CSS Support for Low Cost UEs," R1-151592, 3GPP TSG RAN WG1 #80bis, Belgrade, Serbia, dated Apr. 20-24, 2015, 3 pages.

* cited by examiner

METHOD OF OPERATING IN IDLE MODE AND APPARATUS USING SAME

CROSS-REFERENCE TO RELATED APPLICATIONS

This application is a National Stage application under 35 U.S.C. § 371 of International Application No. PCT/KR2019/001611, filed on Feb. 11, 2019, which claims the benefit of U.S. Provisional Application No. 62/628,295 filed on Feb. 9, 2018. The disclosures of the prior applications are incorporated by reference in their entirety.

BACKGROUND

Field

The present disclosure relates to wireless communication, and more particularly, a method operating in an idle mode in a wireless communication system, and an apparatus using the method.

Related Art

In 3rd generation partnership project (3GPP), there was an agreement on an overall schedule and concept for 5G standardization in a workshop held in September 2015. An enhanced mobile broadband (eMBB), massive machine type communication (MTC), ultra-reliable and low latency communication (URLLC), or the like was specified as a top-level use-case. In order to satisfy a service scenario and a new requirement, in the 3GPP, it was determined to define a new radio (NR) different from the existing long term evolution (LTE), and both the LTE and the NR were defined as a 5G radio access technique.

It is very important to minimize power consumption of a device in wireless communication. Reducing of power consumption has been developed in various ways depending on a communication requirement of the device. For example, a device used in Internet of things (IoT) or machine-type communication (MTC) requires transmission of a very short message with a relatively long cycle, but requires a very long battery lifespan of tens or hundreds of days.

Disclosed is a method of adaptively reducing power consumption depending on various purposes.

SUMMARY

The present disclosure provides a method operating in an idle mode, and a device using the method.

In an aspect, a method for communicating in a wireless communication system is provided. The method performed by a wireless device includes receiving a semi-persistent scheduling (SPS) command for indicating an activation of SPS transmission in an idle mode by using a paging message, and performing SPS transmission according to the SPS command in the idle mode.

In another aspect, a device in a wireless communication system includes a transceiver configured to transmit and receive a radio signal, and a processor operatively coupled to the transceiver. The processor is configured to control the transceiver to receive a semi-persistent scheduling (SPS) command indicating an activation of SPS transmission in an idle mode by using a paging message, and control the transceiver to perform SPS transmission according to the SPS command in the idle mode.

Power consumption of a wireless device is reduced, thereby operating for a longer time.

DESCRIPTION OF EXEMPLARY EMBODIMENTS

Technical features described below may be used in a communication standard by the 3rd generation partnership project (3GPP) standardization organization or a communication standard by the institute of electrical and electronics engineers (IEEE) standardization organization. For example, the communication standard by the 3GPP standard organization includes long term evolution (LTE) and/or an evolution of an LTE system. The evolution of the LTE system includes LTE-advanced (LTE-A), LTE-A Pro, and/or a5G new radio (NR). The communication standard by the IEEE standard organization includes a wireless local area network (LAN) system such as IEEE 802.11a/b/g/b/ac/ax or the like. The aforementioned system uses various multiple access techniques such as orthogonal frequency division multiple access (OFDMA) and/or single carrier-frequency division multiple access (SC-FDMA) or the like in uplink and/or downlink. For example, only the OFDMA may be used in downlink and only the SC-FDMA may be used in uplink, or the OFDMA and the SC-FDMA may be used together in downlink and/or uplink.

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a gNB, a base transceiver system (BTS), an access point, etc. A transmission reception point (TRP) includes an antenna array having one or more antenna elements. The BS may include one or more TRPs.

A new radio (NR) which is a 5G radio access technique supports various bandwidths and frequency bands for more flexible scheduling. Not only a frequency band below 6 GHz but also a frequency band above 6 GHz is supported. A supported bandwidth is up to 100 MHz in the band below 6 GHz and is up to 400 MHz in the band above 6 GHz. In addition, unlike the 3GPP LTE in which a subcarrier spacing is fixed to 15 kHz, the NR may support a variety of subcarrier spacing of 15 kHz, 30 kHz, 60 kHz, 120 KHz, and 240 kHz.

The NR standard supports various numerologies. A structure of a radio frame varies depending on the numerology. Table 1 shows an example of the numerology to be supported.

TABLE 1

| Numerology Index ($\mu$) | Subcarrier spacing (kHz) | Cyclic prefix | Number of OFDM symbols per slot | Number of slots per radio frame | Number of slots per subframe |
|---|---|---|---|---|---|
| 0 | 15 | Normal | 14 | 10 | 1 |
| 1 | 30 | Normal | 14 | 20 | 2 |
| 2 | 60 | Normal | 14 | 40 | 4 |
| 2 | 60 | Extended | 12 | 40 | 4 |
| 3 | 120 | Normal | 14 | 80 | 8 |
| 4 | 250 | Normal | 14 | 160 | 16 |

Figure 1:
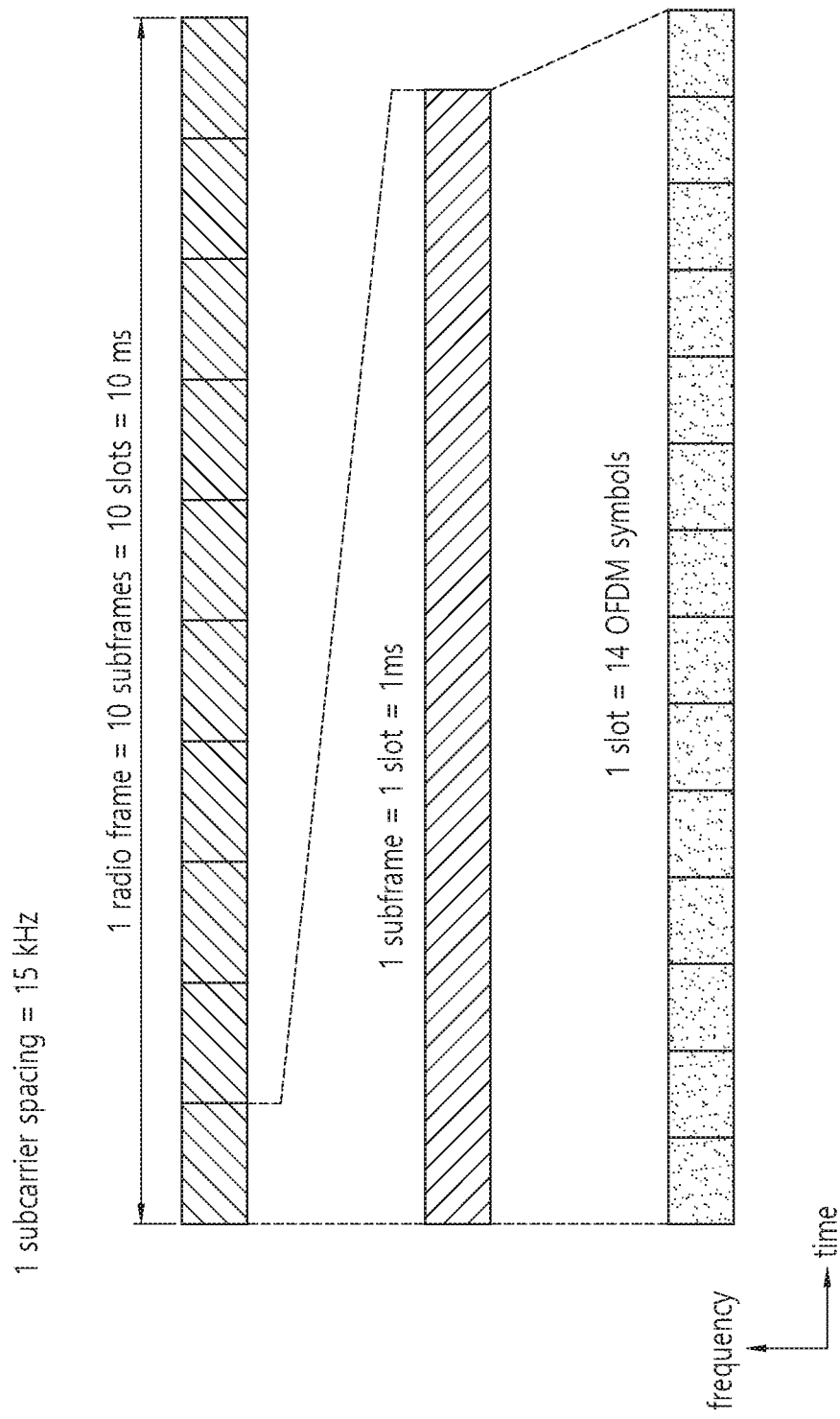
FIG. 1 shows an example of a radio frame structure to which the present disclosure is applied.

FIG. 1 shows an example of a radio frame structure to which the present disclosure is applied. Table 1 shows an example of a numerology index $\mu$=0.

A slot may include a plurality of orthogonal frequency division multiplexing (OFDM) symbols. The number of OFDM symbols in a slot of Table 1 is for exemplary purposes only. The OFDM symbol is only for expressing one symbol period in a time region, and is not limited to a multiple-access scheme or a terminology. For example, the OFDM symbol may be referred to as another terminology such as a single carrier-frequency division multiple access (SC-FDMA) symbol, a symbol period, or the like.

The OFDM symbol in the slot may be divided for downlink (DL), flexible, and uplink (UL). This division may be called as a slot format. Information on the slot format may be reported to a wireless device by a BS. The wireless device may receive information on the slot format through a higher layer signal and/or downlink control information (DCI) on a physical downlink control channel (PDCCH). The wireless device assumes that DL transmission occurs in a DL OFDM symbol or a flexible OFDM symbol. The wireless device may perform UL transmission in a UL OFDM symbol or a flexible OFDM symbol.

A resource block (RB) may include a plurality of subcarriers contiguous in a frequency region. For example, the RB may include 12 subcarriers. A common RB (CRB) is an RB in which an index is determined according to a numerology. A physical RB (PRB) is an RB defined in a bandwidth part (BWP). Assume that there are 20 RBs in the overall bandwidth of a specific numerology. The CRB is indexed from 0 to 19. When the BWP includes four CRBs (from a CRB 4 to a CRB 7) among the 20 RBs, the PRB in the BWP is indexed from 0 to 3.

The BWP may be defined according to a size and a start point from the CRB 0 on a given carrier. A specific number (e.g., up to 4) of BWPs may be configured to the wireless device. Only a specific number (e.g., 1) of BWPs may be activated for each cell at a specific time point. The number of configurable BWPs or the number of BWPs to be activated may be configured commonly for UL and DL or may be configured individually. The wireless device may expect DL transmission only in an activated DL BWP. The wireless device may perform UL transmission only in an activated UL BWP.

The wireless device may obtain a time and/or frequency synchronization with a cell, and may perform cell discovery to obtain a cell identifier (ID). A synchronization channel such as a primary synchronization signal (PSS), a secondary synchronization signal (SSS), a physical broadcast channel (PBCH), or the like may be used for the cell discovery.

Figure 2:
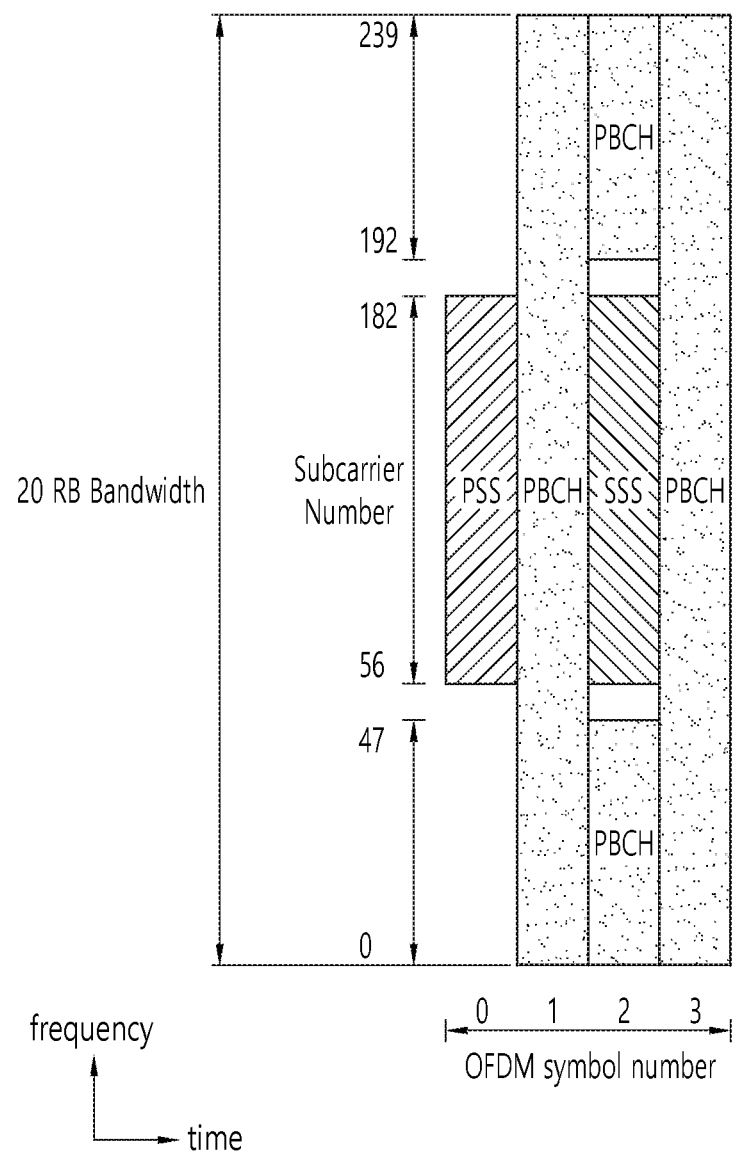
FIG. 2 shows an example of a synchronization channel applied to an example of the present specification.

FIG. 2 shows an example of a synchronization channel applied to an embodiment of the present disclosure. Each of a PSS and an SSS may be transmitted through 127 subcarriers in one OFDM symbol. A PBCH may be transmitted through 240 subcarriers in 3 OFDM symbols.

A synchronization signal/PBCH (SSB) block includes a time/frequency region in which the PSS, the SSS, and the PBCH are transmitted. The PSS is used to obtain a symbol timing of the SSB block, and indicates three hypotheses for identifying a cell ID. The SSS is used to identify the cell ID, and indicates 336 hypotheses. As a result, 1008 physical cell IDs may be indicated through the PSS and the SSS.

The SSB block may be transmitted repeatedly according to a predetermined pattern in an SSB window. The SSB window may have a length of 5 ms. For example, when L SSB blocks are transmitted during one SSB window, all of the L SSB blocks include the same information, but may be transmitted through beams of different directions. That is, a quasi co-location (QCL) may not be applied for the SSB blocks in one SSB window. A beam used to receive the SSB block may be used in a subsequent operation (e.g., a random access operation or the like) between a wireless device and a network. The SSB window may be repeated with a specific period (e.g., 20 ms). The repetition period may be determined individually according to a numerology.

The PBCH has a bandwidth of 20 RBs in 2nd and 4th OFDM symbols, and has a bandwidth of 8 RBs in a 3rd ODM symbol. A demodulation reference signal (DMRS) for decoding the PBCH is included in the PBCH. A frequency region is determined in the DMRS according to a cell ID value. The DMRS for the PBCH may include information indicating an index of an SSB block.

The PBCH may carry a master information block (MIB). System information (SI) is divided into minimum SI (MSI) and other SI (OSI). The MSI may be divided again into MIB and system information type 1 (SIB1), and the remaining MSI except for the MIB may be called remaining minimum SI (RMSI).

The MIB includes information required to decode the SIB1. For example, the MIB may include at least any one of the SIB1, a message used in the random access procedure, a subcarrier spacing applied to other system information, a frequency offset between RBs transmitted after an SSB block, a bandwidth of PDCCH/SIB, and information for decoding the PDCCH. The MIB may be transmitted periodically, and the same information may be transmitted repeatedly for a specific time period. The SIB1 includes control information, transmitted repeatedly through the PDSCH, for initial access of the UE and information for decoding a different SIB.

A DL channel includes a physical downlink control channel (PDCCH), a physical downlink shared channel (PDSCH), and a physical broadcast channel (PBCH). The UL channel includes a physical uplink control channel (PUCCH), a physical uplink shared channel (PUSCH), and a physical random access channel (PRACH).

The PDSCH carries DL data. The PBCH carries a master information block (MIB) required for initial access. The PUSCH carries UL data.

The PDCCH carries DCI. The DCI includes a UL grant having resource allocation for scheduling PUSCH transmission and a DL grant having resource allocation for scheduling PDSCH transmission. A control resource set (CORESET) is defined as a resource for monitoring the PDCCH. In order to allow the wireless device to identify an owner or content of the DCI in the PDCCH, a unique identifier is masked to cyclic redundancy check (CRC) of the DCI. This identifier is called a radio network temporary identifier (RNTI). When the DCI includes a UL grant or DL grant for a specific wireless device, a cell RNTI (C-RNTI) is used. When the DCI carries system information, a system information RNTI (SI-RNTI) is used.

The PUCCH carries uplink control information (UCI). The UCI may include hybrid automatic repeat request (HARD) ACK/NACK and/or channel state information (CSI). The PUCCH may be transmitted in one or more OFDM symbols according to a PUCCH format.

In 3GPP LTE, a radio resource control (RRC) state of a wireless device includes an RRC idle state and an RRC connected state.

The RRC connected state is a state in which an RRC connection is established between the wireless device and a BS, and the BS and the wireless device may transmit/receive data with each other. The RRC idle state is a state in which the RRC connection is not established, and the wireless device may receive paging or may receive system information.

Figure 3:
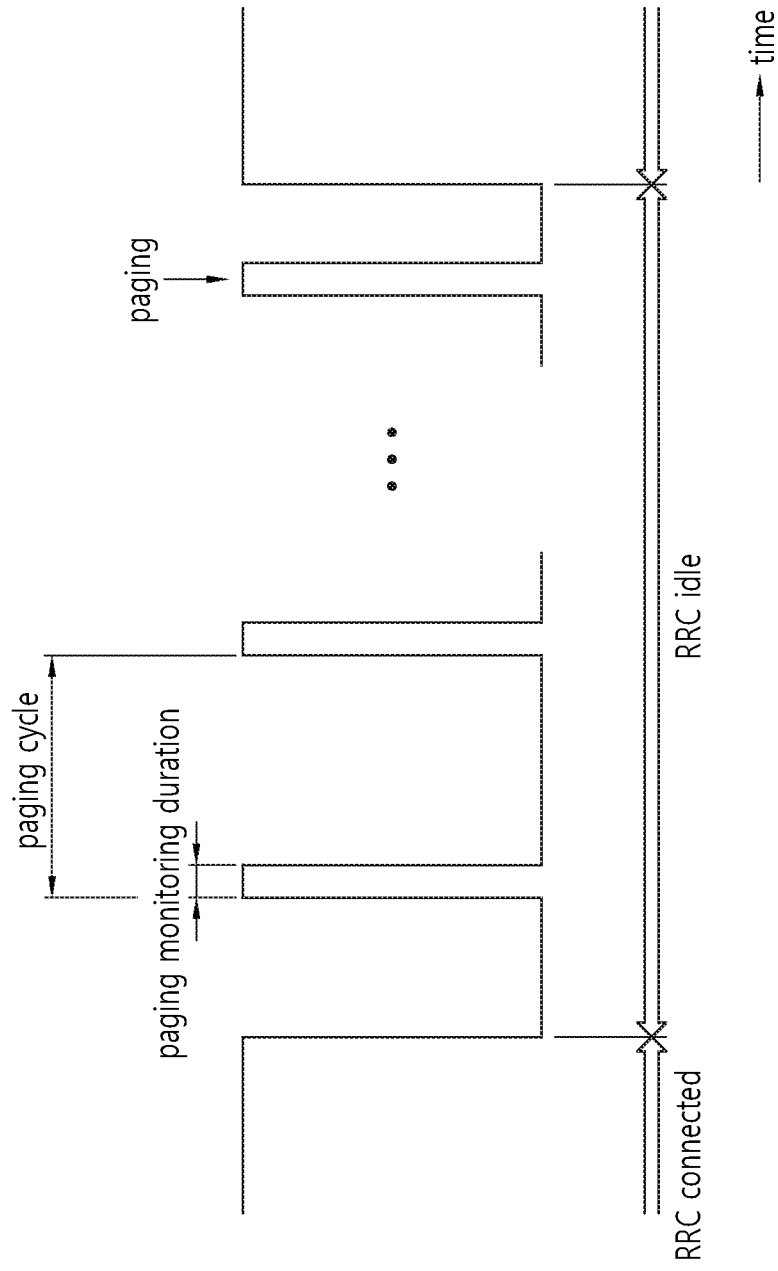
FIG. 3 shows an example in which an RRC state of a wireless device transitions in 3GPP LTE.

FIG. 3 shows an example in which an RRC state of a wireless device transitions in 3GPP LTE.

After transitioning from an RRC connected state to an RRC idle state, the wireless device wakes up during a paging monitoring duration of every paging cycle and attempts to receive a paging message. Paging configuration information given by a BS includes information on a paging cycle and a paging monitoring duration. The paging cycle includes a paging monitoring duration and a paging non-monitoring duration. During the paging non-monitoring duration, the wireless device is in a sleep state in which DL reception and UL transmission cannot be performed, and minimizes power consumption.

Upon receiving the paging message, the wireless device transitions back to the RRC connected state and then attempts to communicate with the BS.

In general, a device used in Internet of things (IoT) or machine-type communication (MTC) is fixed, and it necessary to minimize power consumption. Since power is consumed to transition back to the RRC connected state after receiving the paging message, it may be more efficient to perform DL reception or UL transmission directly in the RRC idle state.

Hereinafter, an idle mode is a mode in which the wireless device repeatedly wakes up and sleeps while transitioning between the monitoring duration and the non-monitoring duration with a specific cycle. In the idle mode, the wireless device may be in an RRC idle state in which SPS transmission is possible. The monitoring duration is a period in which the wireless device monitors a specific DL channel (e.g., a PDCCH/PDSCH for the paging message).

Figure 4:
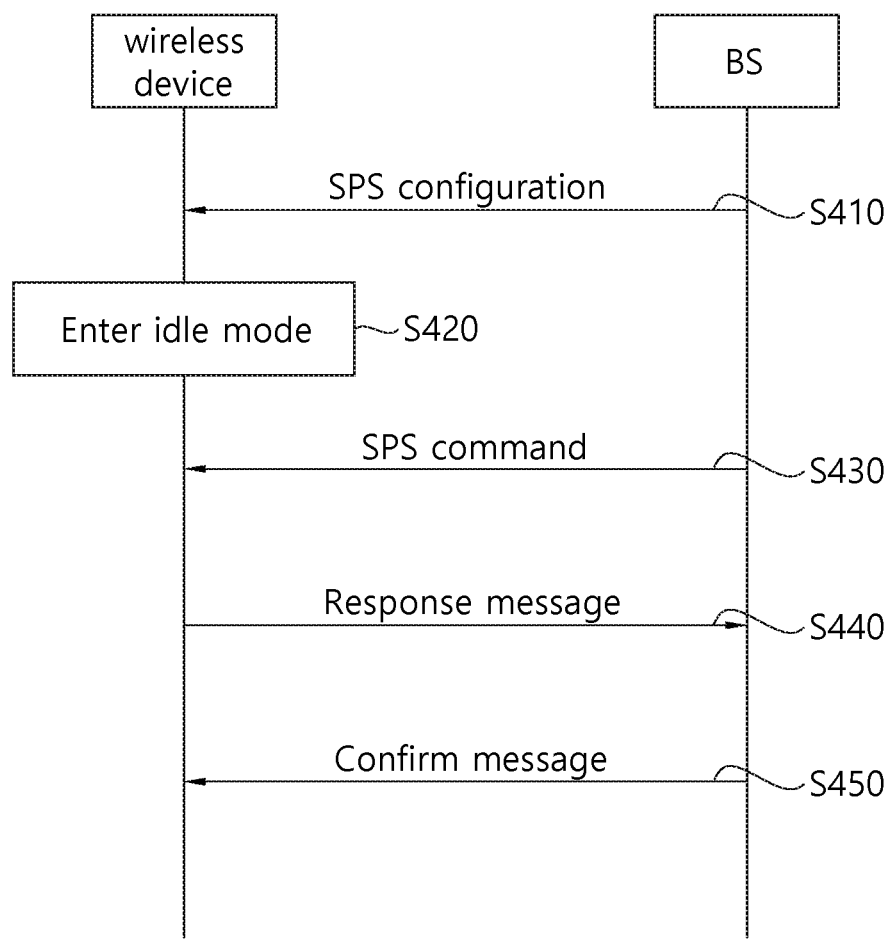
FIG. 4 shows a communication method according to an embodiment of the present disclosure.

FIG. 4 shows a communication method according to an embodiment of the present disclosure.

In step S410, a wireless device receives semi-persistent scheduling (SPS) configuration information in an idle mode from a BS. The SPS configuration information may include a configuration for SPS transmission performed when the wireless device operates in the idle mode.

The wireless device may receive configuration information regarding the idle mode from the BS. The configuration information may include at least one of a paging cycle, a paging offset, and a paging monitoring duration.

The SPS configuration information may include at least one of a DL SPS configuration and a UL SPS configuration.

Hereinafter, SPS PDCCH/PDCCH/PUSCH/PUCCH refers to a channel used according to an SPS configuration.

The DL SPS configuration may include at least one of a slot cycle/offset for SPS PDSCH reception, an SPS PDSCH format (code rate, the number of layers, PMI (precoding matrix index), TBS (transport block size), etc.), an SPS PDSCH transmission resource (an OFDM symbol position in slot, an RB position in slot, the number of OFDM symbols to be assigned, etc.), and when the SPS PDSCH is scheduled through the SPS PDCCH, a slot cycle/offset for SPS PDCCH reception, an SPS PDCCH format (code rate, the number of layers, PMI, DCI size, etc.), an SPS PDCCH transmission resource (a space region, the number of PDCCH candidates, the number of OFDM symbols, etc.). The DL SPS configuration may include information on a paging cycle in which transmission of SPS PDSCH and/or SPS PDCCH is expected. For example, the wireless device may expect reception of SPS PDSCH and/or SPS PDCCH every 10 paging cycles.

The UL SPS configuration may include at least one of a slot cycle/offset for SPS PUSCH reception, an SPS PUSCH format (code rate, the number of layers, PMI, TBS, etc.), an SPS PUSCH transmission resource (an OFDM symbol position in slot, an RB position in slot, the number of OFDM symbols to be assigned, etc.), a UL timing alignment (TA) value, and when the SPS PUSCH is transmitted together with a preamble, a preamble transmission format (a preamble sequence, a preamble format), a preamble transmission resource (an OFDM symbol position in slot, an RB position in slot, etc.). The UL SPS configuration may include information on a paging cycle in which transmission of SPS PUSCH is possible. For example, the wireless device may transmit the SPS PUSCH every 20 paging cycles.

The SPS configuration may include information on an SPS identifier for identifying the idle mode of the wireless device. The SPS identifier may have a smaller number of bits than that of a device identifier (C-RNTI, IMSI (International Mobile Subscriber Identity), TIMSI (Temporary IMSI), etc.)) for identifying the wireless device.

In step S420, the wireless device enters the idle mode.

In step S430, the wireless device may receive an SPS command from the BS during a monitoring duration of the idle mode.

The SPS command may indicate activation/deactivation of predetermined SPS transmission. The SPS command may indicate continuation, stop, resumption, and/or a new SPS command. The SPS command may include a device identifier and/or an SPS identifier.

The SPS command may be transmitted through a paging message provided by the BS. The paging message may be transmitted with a paging monitoring cycle/offset/frequency determined based on the device identifier or the SPS identifier.

The SPS command may be transmitted by being included in the paging message transmitted by the BS. Alternatively, the SPS command may be transmitted through a cycle/offset/frequency resource used in transmission of a PDCCH for scheduling the paging message. The paging message may be transmitted with a paging monitoring duration/offset/frequency determined based on the device identifier or the SPS identifier.

After SPS transmission is activated by the SPS command, an SPS command indicating continuation of SPS transmission may be transmitted cyclically. If the SPS command indicating continuation of SPS transmission for a specific time is not received, the wireless device may stop or deactivate SPS transmission.

In step S440, the wireless device may transmit a response message for the SPS command to the BS. The response message may be an ACK message for confirming reception of the SPS command. This is for surely reporting to the BS whether the SPS command is correctly received.

The response message may be transmitted by using a random access preamble, or may be transmitted on a PUSCH. If the SPS command is received in a slot n, the response message may be transmitted in a slot n+k (where k is an integer satisfying k>0). A time/frequency resource on which the response message is transmitted may be included in the SPS command or the paging message. When the response message is transmitted as the random access preamble, a sequence of the random access preamble may be predetermined. SPS configuration information may include information on the random access preamble.

The response message may be transmitted only when the SPS command indicates activation or deactivation, and may not be transmitted when the SPS command indicates another command.

If the response message is not received for a specific time after the SPS command is transmitted, the BS and the wireless device may end the activated SPS transmission.

In step S450, the BS may transmit a confirm message for a response of the wireless device. The confirm message may be transmitted through a PDCCH or a PDSCH. When the response is received as the random access preamble, the BS may transmit the confirm message in response to the random access preamble.

The wireless device which has transmitted the response may stop or deactivate SPS transmission when the confirm message is not received for a specific time.

Meanwhile, in an idle mode, the wireless device in which SPS transmission is activated may determine that SPS transmission is no longer necessary. The wireless device may transmit to the BS a request message for requesting for deactivating of SPS transmission or stopping of SPS transmission.

The request message may be transmitted as the random access preamble. Alternatively, the request message may be transmitted on a PUSCH or an SPS PUCCH after transmission of the random access preamble.

The BS may provide a response for the request message in response to the random access preamble. If the response for the request message is not received for a specific time, the wireless device may end an SPS operation. Alternatively, if the response for the request message is not received for the specific time, the wireless device may repeatedly transmit the request message. If the response for the request message is not received even after transmission is repeated M times, the wireless device may end the SPS operation.

Figure 5:
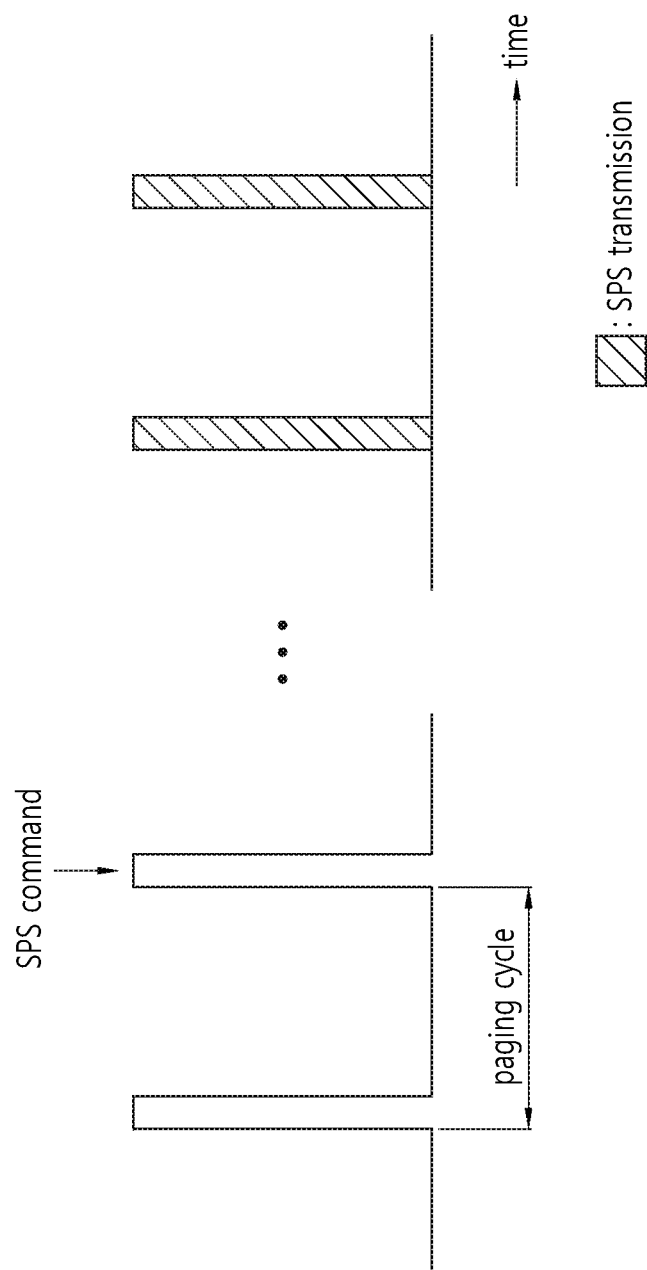
FIG. 5 shows an operation according to an embodiment of the present disclosure.

FIG. 5 shows an operation according to an embodiment of the present disclosure.

A wireless device which has received an SPS command indicating SPS activation in an idle mode performs SPS transmission according to SPS configuration information.

Figure 6:
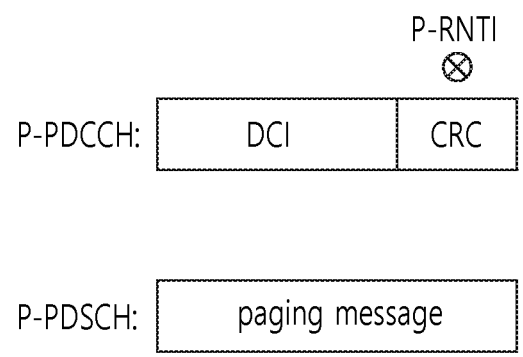
FIG. 6 shows a configuration of a paging message for an SPS command.

FIG. 6 shows a configuration of a paging message for an SPS command.

The paging message may be transmitted on a PDSCH (referred to as P-PDSCH) scheduled by a PDCCH (referred to as P-PDCCH).

DCI on the P-PDCCH may include the SPS command. Alternatively, the paging message on the P-PDSCH may include the SPS command. The DCI on the P-PDCCH may include flag information indicating whether the paging message includes the SPS command.

P-PNTI used in masking of the P-PDCCH may report whether the SPS command is included in the paging message. For example, if the paging message does not include the SPS command, first P-RNTI may be used, and if the paging message includes the SPS command, second P-RNTI may be used. The second P-RNTI may be a device-specific identifier. Alternatively, the second P-RNTI may be a common identifier, and the paging message may include a plurality of SPS commands for a plurality of wireless devices.

Figure 7:
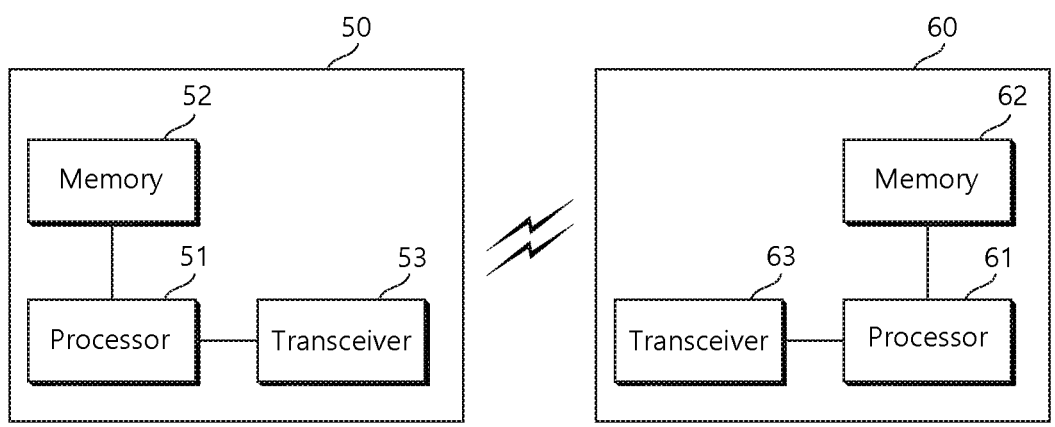
FIG. 7 is a block diagram showing a wireless communication system for implementing an embodiment of the present specification.

FIG. 7 is a block diagram showing a wireless communication system for implementing an embodiment of the present specification.

A wireless device 50 includes a processor 51, a memory 52, and a transceiver 53. The memory 52 is operatively coupled to the processor 51, and stores various instructions executed by the processor 51. The transceiver 53 is operatively coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

ABS 60 includes a processor 61, a memory 62, and a transceiver 63. The BS 60 may operate in an unlicensed band. The memory 62 is operatively coupled to the processor 61, and stores various instructions executed by the processor 61. The transceiver 63 is operatively coupled to the processor 61, and transmits and/or receives a radio signal. The processor 61 implements the proposed functions, procedures, and/or methods. In the aforementioned embodiment, an operation of the BS may be implemented by the processor 61. When the aforementioned embodiment is implemented with a software instruction, the instruction may be stored in the memory 62, and may be executed by the processor 61 to perform the aforementioned operation.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the embodiment is implemented in software, the aforementioned scheme may be implemented using a module (procedure, function, etc.) which performs the aforementioned function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A method for communicating in a wireless communication system, the method performed by a wireless device and comprising:

receiving, from a base station, configuration related to a semi-persistent scheduling (SPS);

receiving, from the base station, downlink control information (DCI) for scheduling a physical downlink shared channel (PDSCH), wherein the DCI is received on a physical downlink control channel (PDCCH) while the wireless device is in a radio resource control (RRC) idle state, wherein the DCI includes information indicating whether a paging message includes a SPS command;

receiving, from the base station, a paging message including the SPS command for indicating an activation of SPS transmission, wherein the paging message is received while the wireless device is in the RRC idle state, wherein the SPS command includes an identifier, and wherein the paging message is transmitted in a paging monitoring cycle based on the identifier; and performing, while the wireless device is in the RRC idle state, the SPS transmission on the SPS command and the configuration related to the SPS.

2. The method of claim 1, wherein an identifier masked to cyclic redundancy check (CRC) of the DCI indicates that the SPS command is included in the paging message.

3. The method of claim 1, further comprising:

transmitting a response message for confirming a reception of the SPS command included in the paging message.

4. The method of claim 3, wherein a predetermined random access preamble is transmitted as the response message.

5. The method of claim 1, further comprising:

receiving, from the base station, an SPS command indicating a continuation of the SPS transmission cyclically, determining the SPS command indicating the continuation of the SPS transmission has not been received for a specific time, wherein the SPS transmission is de-activated based on the SPS command indicating the continuation of the SPS transmission not being received for the specific time.

6. A device configured to operate in a wireless communication system, the device comprising:

a transceiver configured to transmit and receive a radio signal; and a processor operatively coupled to the transceiver and configured to:

receive, from a base station, configuration related to a semi-persistent scheduling (SPS);

receive, from the base station, downlink control information (DCI) for scheduling a physical downlink shared channel (PDSCH), wherein the DCI is received on a physical downlink control channel (PDCCH) while the device is in a radio resource control (RRC) idle state, wherein the DCI includes information indicating whether a paging message includes a SPS command;

receive, from the base station, a paging message including the SPS command for indicating an activation of SPS transmission, wherein the paging message is received while the device is in the RRC idle state, wherein the SPS command includes an identifier, and wherein the paging message is transmitted in a paging monitoring cycle based on the identifier; and perform, while the device is in the RRC idle state, the SPS transmission based on the SPS command and the configuration related to the SPS.

7. The device of claim 6, wherein an identifier masked to cyclic redundancy check (CRC) of the DCI indicates that the SPS command is included in the paging message.

* * * * *